United States Patent [19]

McKendree

[11] 4,174,551

[45] Nov. 20, 1979

[54] FEATHER PLUCKING DEVICE

[76] Inventor: Scott W. McKendree, 1893 Del Moro, Klamath Falls, Oreg. 97601

[21] Appl. No.: 866,568

[22] Filed: Jan. 3, 1978

[51] Int. Cl.² .......................................... A22C 21/02
[52] U.S. Cl. ................................................. 17/11.1 R
[58] Field of Search ..................................... 17/11.1 R

[56] References Cited

U.S. PATENT DOCUMENTS

| | | | |
|---|---|---|---|
| 2,276,469 | 3/1942 | Cummings | 17/11.1 R |
| 2,714,222 | 8/1955 | McKendree | 17/11.1 R |
| 2,753,590 | 7/1956 | McKendree | 17/11.1 R |

*Primary Examiner*—Willie G. Abercrombie

*Attorney, Agent, or Firm*—Kolisch, Hartwell, Dickinson & Stuart

[57] ABSTRACT

An improved feather plucking device of the type having a plurality of soft rubber projections are arranged about the peripheral surface of a resilient drum. The drum is securely attached to a threaded shaft for rotation therewith by a pair of opposing washers and nuts which press firmly against the sides of the drum. The improvement comprises a pair of compressible bosses integrally formed with the sides of the drum and extending outwardly therefrom allowing the washers to be forcibly tightened against the sides of the drum with minimum deformation of the body of the drum.

2 Claims, 4 Drawing Figures

FEATHER PLUCKING DEVICE

BACKGROUND AND SUMMARY OF THE INVENTION

The following invention relates to means for removing feathers from fowl.

In my former U.S. Pat. No. 2,714,222 I disclosed a feather plucking device comprising a rubber drum having a plurality of soft rubber conical projections extending from the peripheral surface thereof. The drum is mounted for rotation on a power-driven threaded shaft extending through the center of the drum. The conical projections act to penetrate the mass of feathers on the fowl and remove the feathers when a fowl is pressed against the rapidly rotating drum.

An important feature of the above-described feather plucking device is the resilience or elasticity of the drum and conical projections. This resiliency allows the device to yield radially when a fowl is pressed against the rotating drum, thereby preventing the skin of the fowl from being broken or abraded.

The surface resilience of the device is due to the softness of the rubber used in forming the drum and conical projections. In addition a plurality of longitudinal apertures enhance the radial resilience of the drum.

One of the problems associated with the above-described device is its tendency to strip relative to the shaft during the feather plucking operation. The drum of this device is secured to a power-driven threaded shaft by means of a pair of opposing washers and nuts which are tightened against the sides of the drum. Unless the opposing washers and nuts are forcibly tightened against the sides of the drum, slipping occurs when the fowl is pressed tightly against the drum and as feather oils and other debris work their way between the washers and the sides of the drum. This slipping produces a loss of efficiency in the use of the feather plucker.

Forcibly tightening the two opposing nuts and washers against the sides of the drum to minimize slipping, however, causes the opposing washers to press deeply into the sides of the soft rubber drum, deforming the drum transversely, and making it less resilient near its sides. This distortion largely negates the resilience derived from the transverse apertures within the drum. Consequently, it is more difficult to remove the feathers from the fowl without abrading or breaking the skin of the fowl.

Furthermore, if such deformation is transversely asymmetrical, the drum member tends to wobble about the rotating axis, which also adversely effects the operation of the device.

It is therefore a principle object of the present invention to provide an improved feather plucking device which can be securely mounted on a threaded shaft without the rubber drum member being appreciably deformed.

It is another object of the present invention to provide such an improved feather plucking device which can be easily and simply manufactured in a mold.

The improved feather plucking device comprises a resilient, or rubbery, drum of cylindrical shape having a plurality of resilient conical projections, a plurality of peripheral longitudinal aperture, and a central aperture for mounting the drum on a threaded shaft. The improvement comprises a pair of compressible bosses, formed integrally with the sides of the drum and extending outwardly therefrom, which allow the shaft to be tightly secured to the drum member without appreciably deforming the main body of the drum.

BRIEF DESCRIPTION OF THE DRAWING

These and other objects and features of the present invention will become apparent as the following description is read in conjunction with the accompanying drawings, wherein.

DETAILED DESCRIPTION OF THE DRAWINGS

Figure 1:
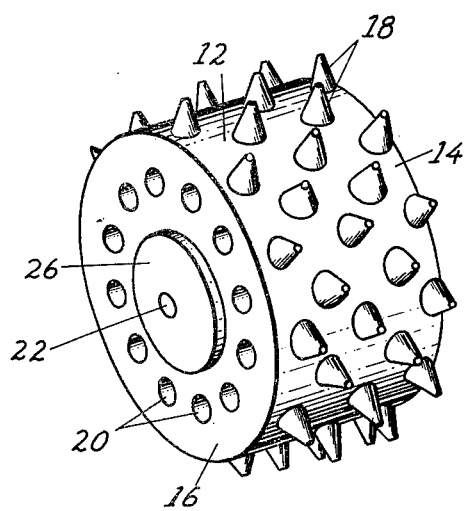
FIG. 1 is a perspective view of the improved feather plucking device.
Figure 2:
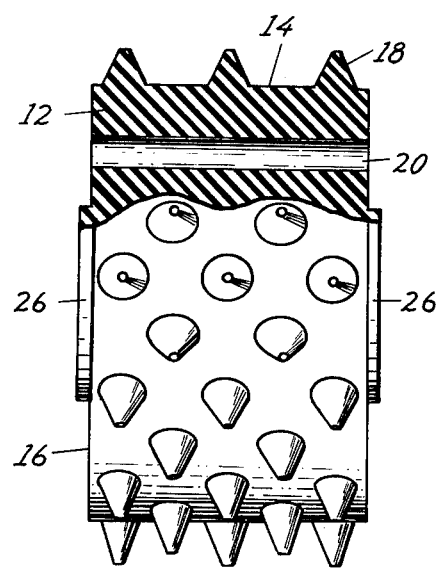
FIG. 2 is a front, partially cutaway view of the same feather plucking device.

Referring now to FIG. 1, the improved invention comprises a resilient, or rubbery, drum 12 having a peripheral surface 14, a pair of opposed, substantially parallel, flat sides 16 and a plurality of conical projections 18 integrally formed with the peripheral surface. The projections act to penetrate the mass of feathers of a fowl and tear the feathers from the fowl when the fowl is pressed tightly against the rotating drum.

As described more fully in my U.S. Pat. No. 2,714,222, the drum is formed from soft rubber having a durometer reading of 30 to 35, and is about two and one-half inches in diameter and one and one-half inches thick. The conical projections 18 are so arranged that they can be pressed flat against the peripheral surface without contacting adjacent projections.

The rubber drum is provided with a plurality of apertures 20 extending from side-to-side therethrough. These apertures are spaced equally about the outer portion of the drum. Apertures 20 allow the drum to yield somewhat to pressure as the fowl is pressed tightly against the rotating drum member. Aperatures 20 are typically about one-quarter-inch in diameter.

A central aperture 22 extending from side-to-side through the drum is provided for mounting the drum member on a threaded power-driven rotatable shaft 24, as described below.

The improvement in the feather plucking device comprises a pair of circular bosses 26 integrally formed with the sides of the drum in the central region of the sides of the drum and projecting outwardly therefrom. The bosses are centrally positioned about central aperture 22 and are preferably about one inch in diameter. The bosses extend outwardly from the sides of the drum member about one-eighth inch (⅛").

Figure 3:
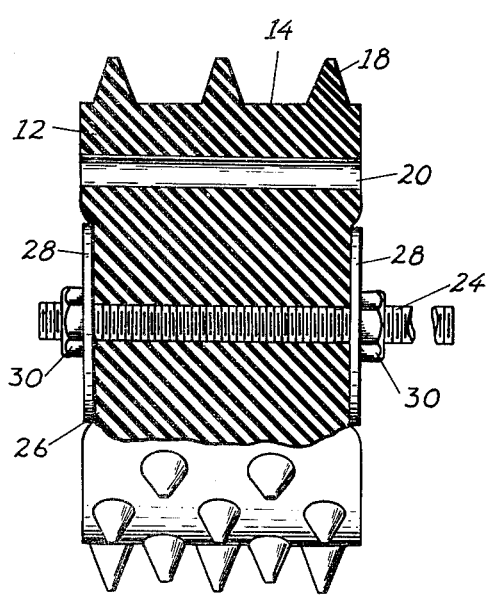
FIG. 3 is a front, partially cutaway view of the same feather plucking device securely mounted on a shaft.

The drum is mounted on a threaded shaft 24 for rotation therewith by a pair of washers 28 and nuts 30, as illustrated in FIG. 3. The washers may be approximately one inch in diameter, and substantially coextensive with the flat surfaces of the bosses. This provides a sufficiently large contact surface between the bosses and washers in the shaft-mounted drum, and retains an outer resilient ring of about ¾" thickness between the peripheral surface of the drum and the outer edge of the washers.

To prevent the drum member for slipping on the rotating shaft during operation, the nuts are tightened against the outer sides of the bosses on the drum with an applied torque of about 20 inch-pounds. This compresses the bosses so that the washers are approximately flush with the undeformed sides of the drum member as shown in FIG. 3.

Figure 4:
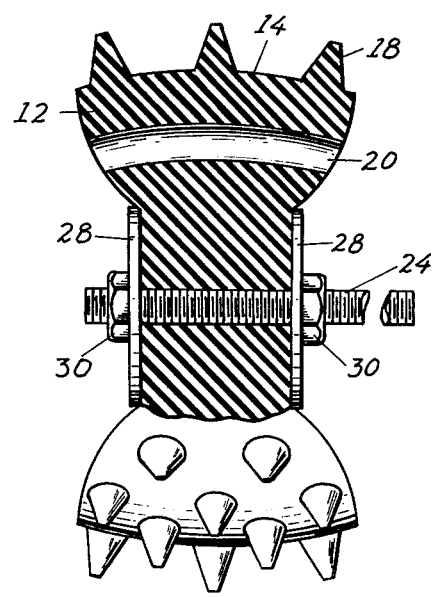
FIG. 4 is a front, partially cutaway view of a prior feather plucking device tightly mounted on a shaft.

To illustrate the advantages of the improved feather plucker over the previously described invention, there is shown in FIGS. 3 and 4 the improved and old invention, respectively, tightly secured to a threaded shaft by applying, in both devices approximately the same amount of torque to the opposing nuts. As seen in FIG. 4, this degree of tightening causes the washers to become deeply imbedded in the sides of the drum of the old device, compressing the central region of the drum and drawing the sides of the drum substantially inwardly. The effect of this is to distort apertures 20 and the peripheral surface of the drum with a consequent loss of resilience, and unevenness of peripheral surface.

By contrast, the improved feather plucker which includes peripheral bosses 26 shows only slight deformation under this degree of tightening. The bosses in effect provide an extended longitudinal region coextensive with both washers which can be longitudinally compressed without causing appreciable deformation of the rubber drum.

As a result, the tightly secured drum member is substantially uniformly resilient, the peripheral surface is even, and the possibility of drum wobble during operation has been eliminated.

It is claimed and desired to secure by Letters Patent:

1. A feather plucking device comprising a resilient drum having opposed, substantially parallel sides, a central aperture extending from side-to-side through a central region of said drum, a plurality of angularly-spaced apertures extending from side-to-side through a peripheral region of said drum, and a pair of bosses, each formed integrally with the central region of a side of the drum and extending outwardly therefrom about said central aperture, said drum being designed for detachable mounting on a rotatable shaft extending through said central aperture by opposing washers pressed against the bosses on opposite sides of the drum to frictionally inhibit rotation of the drum relative to the shaft, said bosses allowing said washers to be pressed tightly against said central region with minimum side-to-side deformation of said peripheral region occurring.

2. The device of claim 1 wherein said bosses project outwardly from said sides of the drum at least 1/16".

* * * * *